United States Patent
Daye et al.

(10) Patent No.: US 8,824,641 B2
(45) Date of Patent: *Sep. 2, 2014

(54) REAL TIME AUTOMATIC CALLER SPEECH PROFILING

(71) Applicant: International Business Machines Corporation, Armonk, NY (US)

(72) Inventors: Sheri G. Daye, Boca Raton, FL (US); Peeyush Jaiswal, Boca Raton, FL (US); Fang Wang, Plano, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/057,600

(22) Filed: Oct. 18, 2013

(65) Prior Publication Data

US 2014/0064464 A1    Mar. 6, 2014

Related U.S. Application Data

(63) Continuation of application No. 13/603,053, filed on Sep. 4, 2012, now Pat. No. 8,600,013.

(51) Int. Cl.
 *H04M 1/64* (2006.01)
 *H04M 1/00* (2006.01)
 *G10L 17/00* (2013.01)

(52) U.S. Cl.
 USPC .................... 379/88.01; 704/246; 455/563

(58) Field of Classification Search
 USPC ............... 704/9, 246, 257, 273, 250; 709/204
 See application file for complete search history.

(56) References Cited

U.S. PATENT DOCUMENTS

| | | | |
|---|---|---|---|
| 5,940,793 A | 8/1999 | Attwater et al. | |
| 6,643,622 B2 * | 11/2003 | Stuart et al. | 704/275 |
| 6,671,672 B1 * | 12/2003 | Heck | 704/273 |
| 6,721,702 B2 | 4/2004 | Schneider | |
| 6,829,603 B1 * | 12/2004 | Chai et al. | 1/1 |
| 6,981,256 B2 * | 12/2005 | Jawahar et al. | 718/101 |
| 7,587,322 B2 | 9/2009 | Schimmer et al. | |
| 7,640,160 B2 * | 12/2009 | Di Cristo et al. | 704/257 |
| 8,358,747 B2 | 1/2013 | Daye et al. | |

(Continued)

OTHER PUBLICATIONS

U.S. Appl. No. 13/603,053—Notice of Allowance Mailed Jul. 31, 2013.

(Continued)

*Primary Examiner* — Mohammad Islam
(74) *Attorney, Agent, or Firm* — John R. Pivnichny; Law Office of Jim Boice (57) ABSTRACT

A computer-implemented method, system, and/or computer program product recognizes a voice input received by an interactive voice recognition system. An unintelligible voice input, which is unintelligible due to background noise at the caller's location, is received from a caller. Upon determining that the unintelligible voice input does not match any entry from a lexicon of known voice inputs, the unintelligible voice input is stored in a no-match-based user profiles database, and the caller is prompted to transmit a non-verbal electronic input to clarify the unintelligible voice input. This non-verbal electronic input is used to match the unintelligible voice input with a specific known voice input from the lexicon of known voice inputs, which is updated with the unintelligible voice input. The updated lexicon is subsequently used in future phone calls from the user to match the unintelligible voice input to the user-requested activity for the caller.

20 Claims, 4 Drawing Sheets

(56) References Cited

U.S. PATENT DOCUMENTS

| | | |
|---|---|---|
| 2003/0163739 A1* | 8/2003 | Armington et al. ............ 713/202 |
| 2003/0179876 A1* | 9/2003 | Fox et al. ................. 379/265.02 |
| 2003/0191648 A1 | 10/2003 | Knott et al. |
| 2005/0047394 A1* | 3/2005 | Hodson et al. ................ 370/352 |
| 2005/0213743 A1* | 9/2005 | Huet et al. ............... 379/265.09 |
| 2006/0085189 A1* | 4/2006 | Dalrymple et al. ........... 704/250 |
| 2006/0206724 A1* | 9/2006 | Schaufele et al. ............ 713/186 |
| 2008/0071534 A1 | 3/2008 | Johnson |
| 2009/0257566 A1 | 10/2009 | Dixon |
| 2010/0145709 A1* | 6/2010 | Kumar ......................... 704/273 |
| 2012/0328085 A1 | 12/2012 | Daye et al. |

OTHER PUBLICATIONS

U.S. Appl. No. 12/615,384—Non-Final Office Action Mailed Mar. 1, 2012.

U.S. Appl. No. 12/615,384—Notice of Allowance Mailed Aug. 6, 2012.

U.S. Appl. No. 13/603,053—Non-Final Office Action Mailed Mar. 13, 2013.

* cited by examiner

REAL TIME AUTOMATIC CALLER SPEECH PROFILING

The present application is a continuation of U.S. patent application Ser. No. 13/603,053, filed on Sep. 4, 2012, and entitled, "Real Time Automatic Caller Speech Profiling," which is incorporated herein by reference.

BACKGROUND

The present disclosure relates to the field of computers, and specifically to the management of voice inputs. Still more particularly, the present disclosure relates to managing computer-unintelligible voice inputs.

SUMMARY

A computer-implemented method, system, and/or computer program product recognizes a voice input received by an interactive voice recognition system. An unintelligible voice input, which is unintelligible due to background noise at the caller's location, is received from a caller. Upon determining that the unintelligible voice input does not match any entry from a lexicon of known voice inputs, the unintelligible voice input is stored in a no-match-based user profiles database, and the caller is prompted to transmit a non-verbal electronic input to clarify the unintelligible voice input. This non-verbal electronic input is used to match the unintelligible voice input with a specific known voice input from the lexicon of known voice inputs, which is updated with the unintelligible voice input. The updated lexicon is subsequently used in future phone calls from the user to match the unintelligible voice input to the user-requested activity for the caller.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
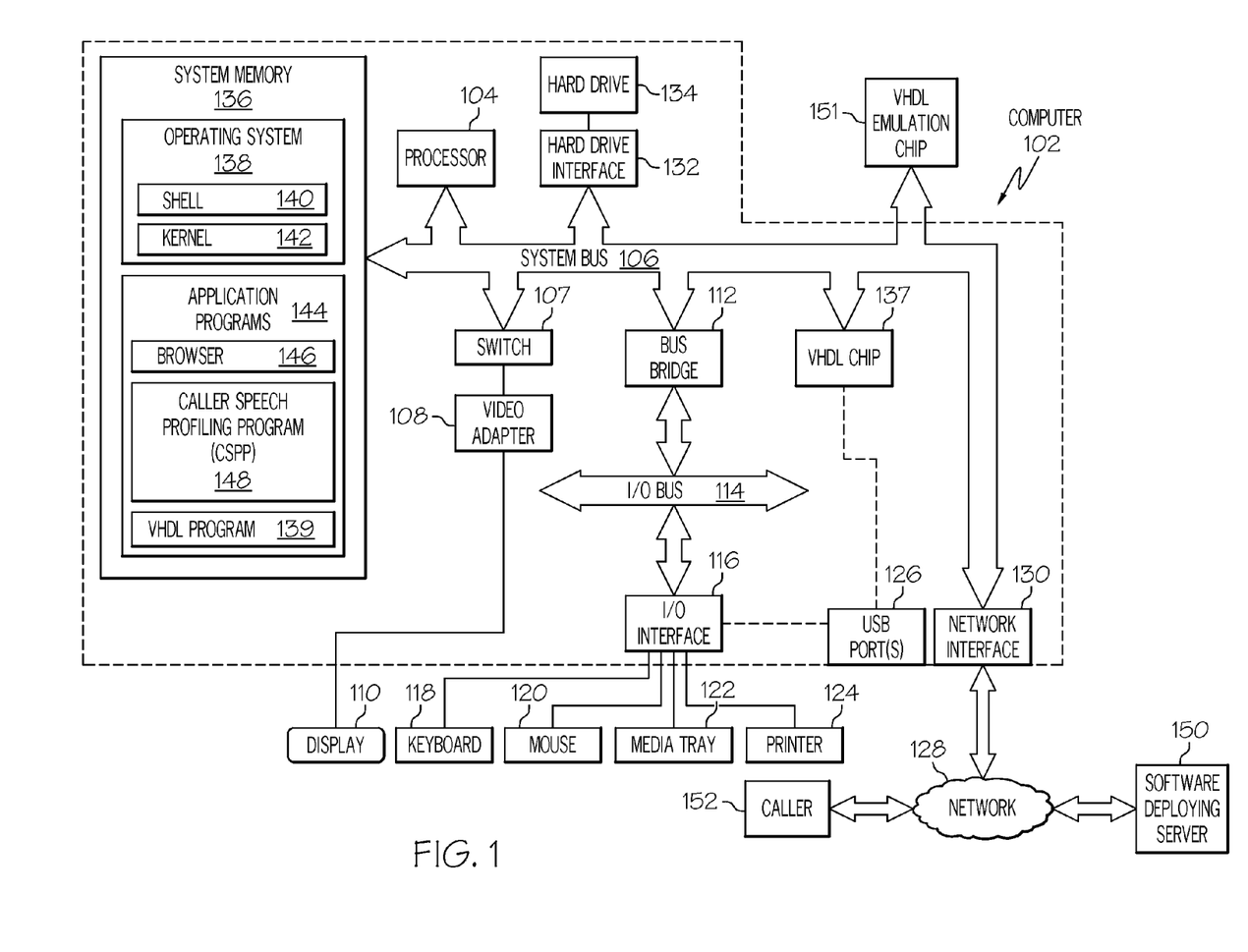
FIG. 1 depicts an exemplary computer in which some or all of the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or caller 152, as well as interactive voice recognition (IVR) system 202 and caller 204 shown in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., caller speech profiling program—CSPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a caller speech profiling program (CSPP) 148. CSPP 148 includes code for implementing the processes described below, including those described in FIGS. 2-4. In one embodiment, computer 102 is able to download CSPP 148 from software deploying server 150, including in an on-demand basis. Note further that, in one embodiment of the present invention, software deploying server 150 performs all of the functions associated with the present invention (including execution of CSPP 148), thus freeing computer 102 from having to use its own internal computing resources to execute CSPP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CSPP 148 causes VHDL program 139 to configure VHDL chip 137, which may be an FPGA, ASIC, etc.

In another embodiment of the present invention, execution of instructions from CSPP 148 results in a utilization of VHDL program 139 to program a VHDL emulation chip 151. VHDL emulation chip 151 may incorporate a similar architecture as described above for VHDL chip 137. Once CSPP 148 and VHDL program 139 program VHDL emulation chip 151, VHDL emulation chip 151 performs, as hardware, some or all functions described by one or more executions of some or all of the instructions found in CSPP 148. That is, the VHDL emulation chip 151 is a hardware emulation of some or all of the software instructions found in CSPP 148. In one embodiment, VHDL emulation chip 151 is a programmable read only memory (PROM) that, once burned in accordance with instructions from CSPP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like.

These and other variations are intended to be within the spirit and scope of the present invention.

Figure 2:
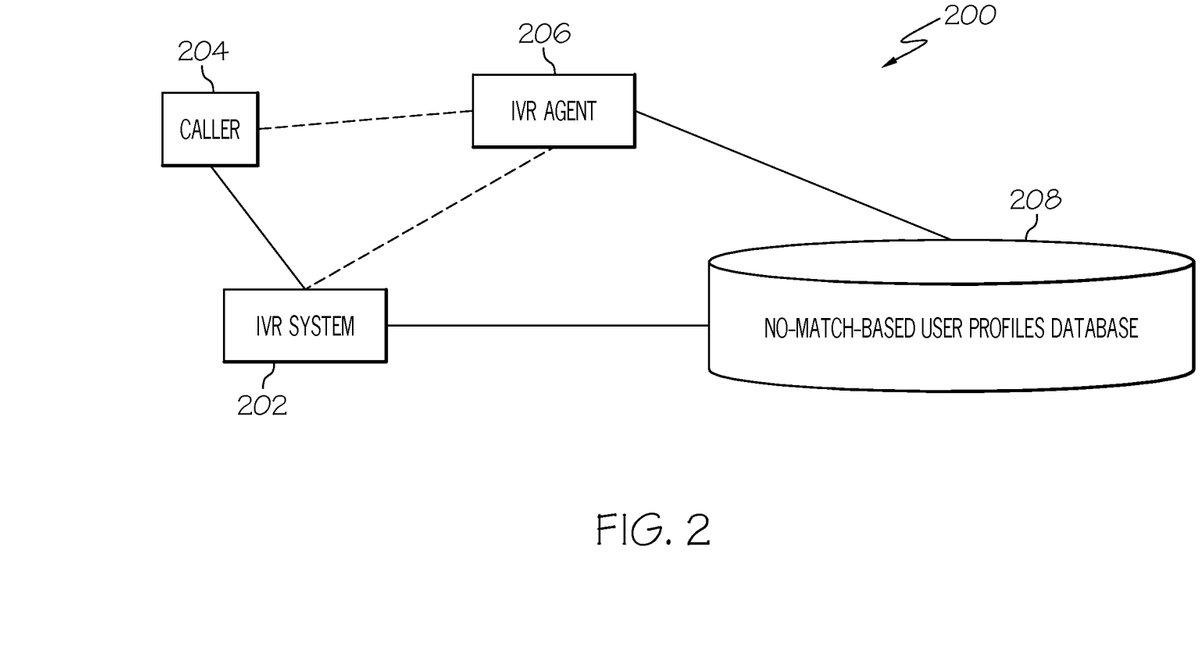
FIG. 2 illustrates an exemplary call network in which the present disclosure may be implemented.

With reference now to FIG. 2, an exemplary call network 200 in which the present disclosure may be implemented is illustrated. A caller 204 calls a receiver such as an interactive voice recognition (IVR) system 202. This call may be made over a plain old telephone system (POTS), a cell phone network, voice over internet protocol (VoIP), etc. Voice input from the caller 204 is digitized by the IVR system 202 to interpret the voice input, in order to direct the call to an appropriate agent and/or to generate a storable, matchable, retrievable file that depicts the voice input. If the IVR system 202 is able to interpret the voice input from the caller 204, then the call is directed to an IVR agent 206, which may be additional IVR logic, or it may be a human agent. If the IVR system 202 is unable to interpret the voice input from the caller 204, then the digitized voice input is stored in a no-match-based user profiles database 208.

Figure 3:
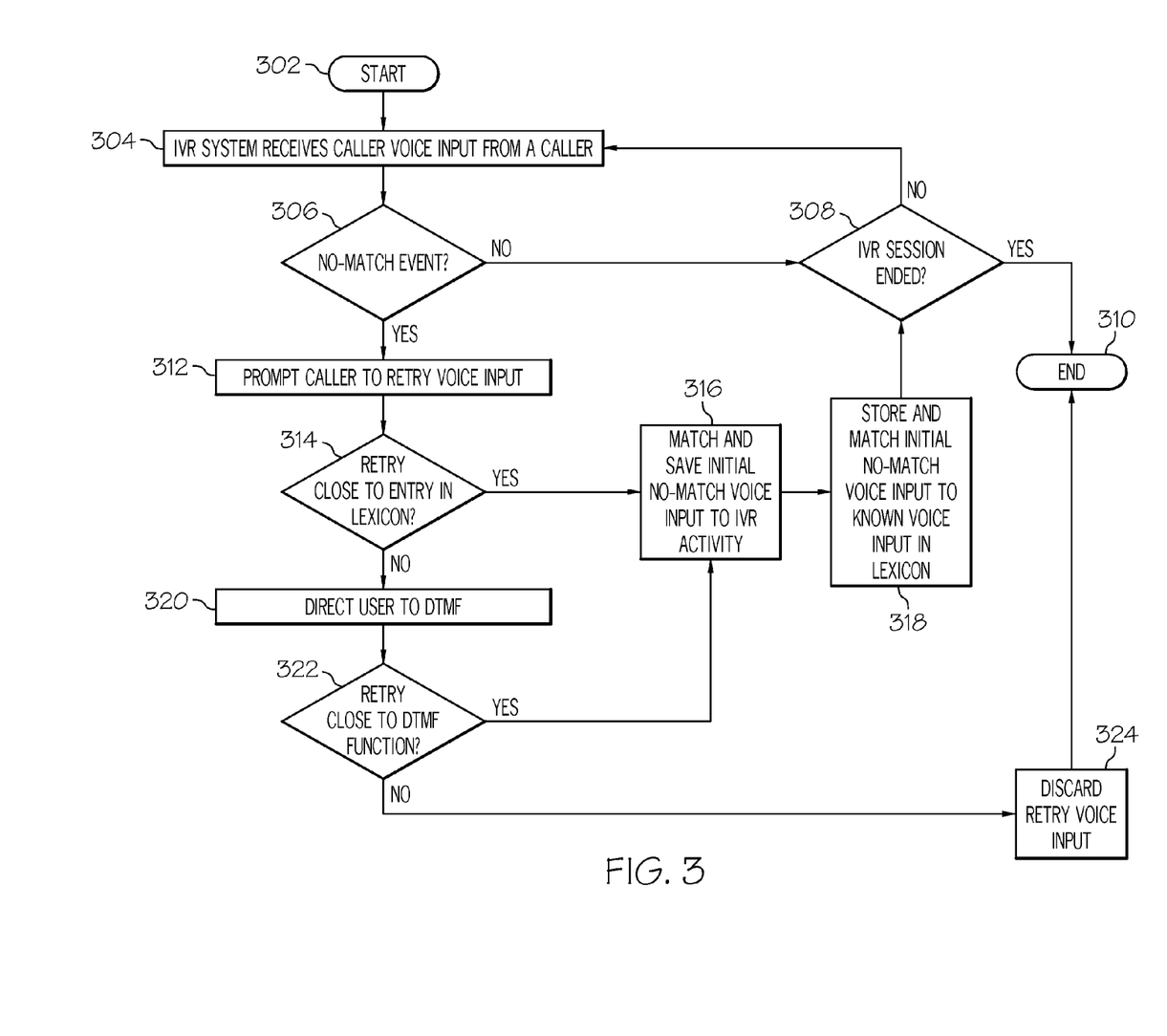
FIG. 3 is a high-level flow-chart of one or more exemplary steps executed by a processor to update a lexicon of voice inputs.

With reference now to FIG. 3, a high-level flow-chart of one or more exemplary steps executed by a processor to update a lexicon of voice inputs from a caller is presented. After initiator block 302, which may be prompted by a caller initiating a session with an IVR system, a call recipient (e.g., the IVR system) receives an initial caller voice input from a caller (block 304). If the IVR system determines that the initial caller voice input is an intelligible voice input that matches an entry from a lexicon of known voice inputs ("no" from query block 306), then the IVR session continues until it is over (query block 308), and the process ends (terminator block 310). However, if the IVR system determines that the initial caller voice input is a computer-unintelligible voice input that does not match any entry from a lexicon of known voice inputs ("yes" from query block 306), then the IVR system prompts the caller to transmit a secondary input to clarify the computer-unintelligible voice input (block 312). Note that the term "computer-unintelligible" describes a voice input that a computer is unable to decipher using voice recognition logic, even if a human may be able to. That is, a computer's voice recognition software may not be programmed to understand someone with a heavy accent, speech impediment, etc., or even someone talking from a phone where there is loud background noise (traffic, equipment, etc.). However, a human may well be able to understand what the caller is saying, particularly if that human is from a same geographic region (i.e., understands the accent), etc. Nonetheless, the caller's input may still be indecipherable/unintelligible to a computer's voice recognition logic.

One exemplary secondary input, as described in block 312, is to simply ask the caller to repeat his voice input. If this repeated voice input matches a voice input of an established lexicon of voice inputs (query block 314), then the computer-unintelligible voice input is matched and saved to a particular IVR activity that is associated with the IVR session (block 316). That is, assume that the IVR session is for on-line banking. The initial computer-unintelligible voice input is matched to the IVR on-line banking activity, and is then saved to a lexicon of voice inputs used with that IVR on-line banking activity. Thus, a match between the computer-unintelligible voice input and the interactive voice recognition activity match the computer-unintelligible caller voice input to a specific known voice input from the lexicon of known voice inputs. For example, assume that the IVR system understands a voice input of "request balance." However, the caller initially said "need balance," and then said "request balance" in response to the prompting described in block 312. The IVR system would then "know" that "request balance" and "need balance" are the same request for 1) this activity and for 2) this caller by storing and matching the initial no-match voice input with a known voice input in the lexicon (block 318). Thereafter, either response from this caller will result in the operations understood by the IVR system as "request balance."

If the retried voice input does not match up with a known voice input in the lexicon, then the caller is prompted to make an entry on his phone keypad, using a system such as a dual tone multi-function (DTMF) system and a menu (block 320). For example, assume that the IVR system is not sure what the caller said. The IVR system would then prompt the user to use his keypad to select from a menu of aurally presented options. If the user presses a button on his phone confirming that "request balance" is what he wanted, then whatever he said with the initial voice input and/or the retried voice input will be stored as meaning "request balance," since one of the input options identifies an input whose definition matches that of the specific known voice input from the lexicon of known voice inputs. In one embodiment, the retried voice input and/or the initial computer-unintelligible voice input must be "close" to the function described by the DTMF response (query block 322). That is, in order to save extraneous noise such as a cough, a car horn honking, etc. as voice inputs for "request balance," the voice inputs must match a known voice input for "request balance" at some pre-defined level (e.g., a 50% match). If the voice inputs are not close enough to a known voice input, then the initial and/or retried computer-unintelligible voice inputs are discarded (block 324). Similarly, if the retried caller voice input from the caller matches a known voice input in the lexicon, then the retried voice input is removed from the lexicon of known voice inputs.

Note that the lexicon of known voice inputs may be exclusive or non-exclusive to the caller. That is, in one embodiment, all new voice inputs are saved for the exclusive use of the caller, such that when the caller calls in the future (or during a later period in a current session), the new voice inputs can be pulled up to match his future voice inputs. This results in a smaller, and thus faster, lexicon (database) of voice inputs for that user. Alternatively, all additions of previously computer-unintelligible voice inputs can be part of a universal lexicon of voice inputs, which may be utilized by any caller. This results in a larger and thus slower lexicon, but has the advantage of heuristically learning more dialects, accents, etc., making the lexicon more universal.

Figure 4:
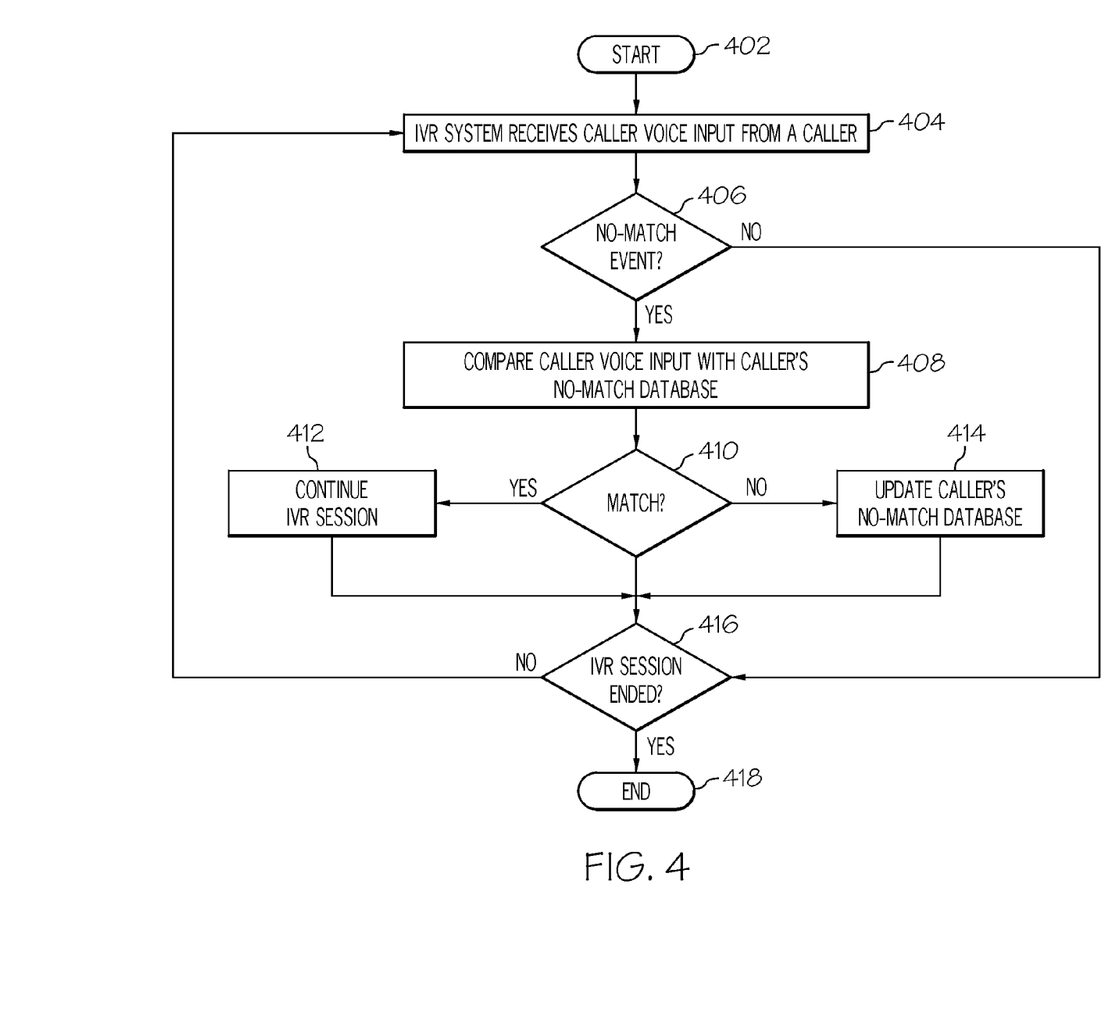
FIG. 4 is a high-level flow-chart of one or more exemplary steps executed by a processor to utilize an updated lexicon of voice inputs in future calls.

Referring now to FIG. 4, a high-level flow-chart of one or more exemplary steps taken to utilize an updated lexicon of voice inputs in future calls is presented. After initiator block 402, which may be prompted by the lexicon of known voice inputs being updated with the computer-unintelligible voice inputs (as described in FIG. 3) to create an updated lexicon of known voice inputs, an IVR system receives a voice input from a caller (block 404). If a no-match event (the IVR system does not understand the voice input by consulting a lexicon of known voice inputs) occurs (block 406), then, as described in block 408, the IVR system consults a database of no-match voice inputs from past calls from the user (assuming that these no-match voice inputs have not been integrated into the lexicon). If there is a match between the newly received voice input with an entry in the lexicon and/or the no-match database (query block 410), then the IVR uses that information to continue the IVR session (block 412). However, if the IVR system still does not understand the voice input (query block 410), then the caller's no-match database and/or lexicon are updated (block 414), utilizing the process described above in FIG. 3. The process continues until the IVR session is over (query block 416), and the process ends (terminator block 418).

In one embodiment described herein, a caller's utterances, which resulted in a no-match event, initially are saved and analyzed. Combined with the trace of activities in the IVR system, the algorithm described above identifies the intention of those utterances and saves them in the particular caller's profile. In future calls, those utterances (which may not be a valid word in any dictionary, but rather are computer-unintelligible gibberish) from the profile become part of allowed grammars too, thus resulted in a personalized speech recognition with higher recognition rate (e.g., learning the caller's accent). The recognition rate is based on matching the caller's intent, as well as matching the particular words in the grammar. The end result of this automatic speech profiling is an easy-to-use IVR system for the caller and higher task completion rate in IVR. In addition, the caller's speech profile can be sent to an agent of the call network for optional review so that the agent can benefit from it to improve future communications with the caller. Furthermore, the agent also has the capability to add new pronunciation/words to the profile, and to send them back to the IVR system so that the IVR system benefits from what the agent learned. In this back and forth process, the caller's speech profile is enhanced to provide a truly personal recognition experience.

In one embodiment, an algorithm of the method begins with use of a normal IVR system as a starting point, where all the speech recognition is based on a developed grammar (since the speech profile is empty). The developed grammar is a basic template used by the IVR system since there is no customized speech profile based on the calls of an individual caller. This starting point is also the case for the new users of the system. Next, during a live call, when a no-match event occurs, besides the normal handling logic, the utterance is saved and analyzed into an alphabetic letter (word) form. Both the utterance and the word are saved in a temporary call profile with the tag for the particular dialog. The caller's behavior continues to be monitored after the no-match event with the following actions:

1) Caller corrected or changed utterance in the subsequent attempt with desired result: compare the saved utterance with the corrected utterance to determine how close they are. If close enough (within a predefined threshold that is adjustable on an individual basis for each caller), the saved utterance and its letter form are moved from the temporary call's profile to the caller's permanent profile with a tag of the particular dialog and the intended grammar output; if not close enough, the saved utterance is removed from the temporary call's profile (as it may be just some environment noise non-specific to the caller). This logic applies to every no-match event that occurs before the corrected utterance.

2) Caller continued call with difficulty and as the call progresses, must use dual-tone multi-function (DTMF) mode to continue: the saved utterance is compared with the grammar entries corresponding to the same DTMF selection to determine how close they are. If there is a saved utterance close enough, the saved utterance and its letter form are moved from the temporary call's profile to the caller's permanent profile along with a tag of the particular dialog and the intended grammar output; if no saved utterance is close enough, the saved utterances are removed from the temporary call's profile. This logic applies to every no-match event that occurs before a DTMF selection. In the case that no DTMF fallback is provided in the IVR system, the caller is transferred to a human agent. The current speech profile is sent to the agent through a Computer Telephony Integration (CTI) link, which the agent can choose to display to aid the communication. A mechanism is provided for the agent to update a database on the caller's intent, which will trigger the IVR system to perform the similar actions as in DTMF case. In addition, the agent is able to add new pronunciations/words to the speech profile in the database that match the user's intent.

For future calls, when the caller's permanent profile is not empty, regular recognition is performed first. When a no-match event occurs, the general grammar, utterances and related letter form from the caller's profile tagged for the particular dialog are used, e.g., the letter form is used as a personal grammar guide for use with the saved utterances for direct comparison. If a match occurs, then the profile's tag reveals the caller's intent and call flow continues as normal. If no match occurs, then the steps above reiterate to engage an algorithm for automatic profiling.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of recognizing a voice input received by an interactive voice recognition system, the method comprising:
   receiving an unintelligible voice input from a caller;
   digitizing, by one or more processors, the unintelligible voice input to generate an unintelligible digitized voice input;
   determining, by one or more processors, that the unintelligible digitized voice input is unintelligible to a computer due to background noise at a caller environment of the caller;
   in response to determining that the unintelligible digitized voice input does not match any entry from a lexicon of known digitized voice inputs, storing the unintelligible digitized voice input in a no-match-based user profiles database;
   prompting the caller to transmit a secondary input to clarify the unintelligible digitized voice input, wherein the secondary input is a non-verbal electronic input that identifies a user-requested activity that the caller was requesting when transmitting the voice input;
   utilizing the non-verbal electronic input to match the unintelligible digitized voice input with a specific known digitized voice input from the lexicon of known digitized voice inputs;
   comparing the unintelligible digitized voice input to the specific known digitized voice input to derive a voice input match percentage, wherein the voice input match percentage describes how closely the unintelligible digitized voice input and the specific known digitized voice input match one another;
   in response to the voice input match percentage exceeding a predetermined value, updating the lexicon of known digitized voice inputs with the unintelligible digitized voice input, wherein the unintelligible digitized voice input is matched to the specific known digitized voice input from the lexicon of known digitized voice inputs;
   matching the unintelligible digitized voice input to the user-requested activity in a database that is specific for the caller;
   receiving the unintelligible voice input in a subsequent phone call from the user and converting the unintelligible voice input in the subsequent phone call into the unintelligible digitized voice input; and
   matching the unintelligible digitized voice input from the subsequent phone call to the user-requested activity for the caller.

2. The method of claim 1, wherein the secondary input further comprises another caller voice input from the caller.

3. The method of claim 2, further comprising:
   in response to said another caller voice input from the caller matching the specific known digitized voice input, discarding said another caller voice input from the lexicon of known digitized voice inputs.

4. The method of claim 1, wherein the secondary input is a caller's response to a menu of input options, wherein one of the input options identifies an input whose definition matches that of the specific known digitized voice input from the lexicon of known digitized voice inputs.

5. The method of claim 1, wherein the lexicon of known digitized voice inputs is exclusive to the caller.

6. The method of claim 1, wherein the lexicon of known digitized voice inputs is non-exclusive to the caller.

7. The method of claim 1, further comprising:
   matching the unintelligible voice input to an interactive voice recognition activity; and
   utilizing a match between the unintelligible voice input and the interactive voice recognition activity to match the unintelligible digitized voice input to the specific known digitized voice input from the lexicon of known digitized voice inputs.

8. The method of claim 1, wherein updating the lexicon of known digitized voice inputs with the unintelligible digitized voice input creates an updated lexicon of known digitized voice inputs, and wherein the method further comprises:
   receiving a new call from the caller, wherein the caller transmits a new caller voice input;
   converting the new caller voice input into a new caller digitized voice input; and
   matching the new caller digitized voice input with a known digitized voice input from the updated lexicon of known digitized voice inputs.

9. A computer program product for recognizing a voice input received by an interactive voice recognition system, the computer program product comprising a computer readable storage medium having program code embodied therewith, the program code readable and executable by a processor to:
   receive an unintelligible voice input from a caller;
   digitize the unintelligible voice input to generate an unintelligible digitized voice input;
   determine that the unintelligible digitized voice input is unintelligible to a computer due to background noise at a caller environment of the caller;
   in response to determining that the unintelligible digitized voice input does not match any entry from a lexicon of known digitized voice inputs, store the unintelligible digitized voice input in a no-match-based user profiles database;
   prompt the caller to transmit a secondary input to clarify the unintelligible digitized voice input, wherein the secondary input is a non-verbal electronic input that identifies a user-requested activity that the caller was requesting when transmitting the voice input;
   utilize the non-verbal electronic input to match the unintelligible digitized voice input with a specific known digitized voice input from the lexicon of known digitized voice inputs;
   compare the unintelligible digitized voice input to the specific known digitized voice input to derive a voice input match percentage, wherein the voice input match percentage describes how closely the unintelligible digitized voice input and the specific known digitized voice input match one another;
   in response to the voice input match percentage exceeding a predetermined value, update the lexicon of known digitized voice inputs with the unintelligible digitized voice input, wherein the unintelligible digitized voice input is matched to the specific known digitized voice input from the lexicon of known digitized voice inputs;
   match the unintelligible digitized voice input to the user-requested activity in a database that is specific for the caller;
   receive the unintelligible voice input in a subsequent phone call from the user and converting the unintelligible voice input in the subsequent phone call into the unintelligible digitized voice input; and match the unintelligible digitized voice input from the subsequent phone call to the user-requested activity for the caller.

10. The computer program product of claim 9, wherein the secondary input further comprises another caller voice input from the caller.

11. The computer program product of claim 10, wherein the program code is further readable and executable by a processor to:
   in response to said another caller voice input from the caller matching the specific known digitized voice input, discard said another caller voice input from the lexicon of known digitized voice inputs.

12. The computer program product of claim 9, wherein the secondary input is a caller's response to a menu of input options, wherein one of the input options identifies an input whose definition matches that of the specific known digitized voice input from the lexicon of known digitized voice inputs.

13. The computer program product of claim 9, wherein the lexicon of known digitized voice inputs is exclusive to the caller.

14. The computer program product of claim 9, wherein the lexicon of known digitized voice inputs is non-exclusive to the caller.

15. The computer program product of claim 9, wherein the program code is further readable and executable by a processor to:
   match the unintelligible voice input to an interactive voice recognition activity; and
   utilize a match between the unintelligible voice input and the interactive voice recognition activity to match the unintelligible digitized voice input to the specific known digitized voice input from the lexicon of known digitized voice inputs.

16. The computer program product of claim 9, wherein updating the lexicon of known digitized voice inputs with the unintelligible digitized voice input creates an updated lexicon of known digitized voice inputs, and wherein the program code is further readable and executable by a processor to:
   receive a new call from the caller, wherein the caller transmits a new caller voice input;
   convert the new caller voice input into a new caller digitized voice input; and
   match the new caller digitized voice input with a known digitized voice input from the updated lexicon of known digitized voice inputs.

17. A computer system comprising:
   a processor, a computer readable memory, and a non-transitory computer readable storage media;
   first program instructions to receive an unintelligible voice input from a caller;
   second program instructions to digitize the unintelligible voice input to generate an unintelligible digitized voice input;
   third program instructions to determine that the unintelligible digitized voice input is unintelligible to a computer due to background noise at a caller environment of the caller;
   fourth program instructions to, in response to determining that the unintelligible digitized voice input does not match any entry from a lexicon of known digitized voice inputs, store the unintelligible digitized voice input in a no-match-based user profiles database;
   fifth program instructions to prompt the caller to transmit a secondary input to clarify the unintelligible digitized voice input, wherein the secondary input is a non-verbal electronic input that identifies a user-requested activity that the caller was requesting when transmitting the voice input;
   sixth program instructions to utilize the non-verbal electronic input to match the unintelligible digitized voice input with a specific known digitized voice input from the lexicon of known digitized voice inputs;
   seventh program instructions to compare the unintelligible digitized voice input to the specific known digitized voice input to derive a voice input match percentage, wherein the voice input match percentage describes how closely the unintelligible digitized voice input and the specific known digitized voice input match one another;
   eighth program instructions to, in response to the voice input match percentage exceeding a predetermined value, update the lexicon of known digitized voice inputs with the unintelligible digitized voice input, wherein the unintelligible digitized voice input is matched to the specific known digitized voice input from the lexicon of known digitized voice inputs;
   ninth program instructions to match the unintelligible digitized voice input to the user-requested activity in a database that is specific for the caller;
   tenth program instructions to receive the unintelligible voice input in a subsequent phone call from the user and converting the unintelligible voice input in the subsequent phone call into the unintelligible digitized voice input; and
   eleventh program instructions to match the unintelligible digitized voice input from the subsequent phone call to the user-requested activity for the caller; and wherein the first, second, third, fourth, fifth, sixth, seventh, eighth, ninth, tenth, and eleventh program instructions are stored on the non-transitory computer readable storage media for execution by the processor via the computer readable memory.

18. The computer system of claim 17, wherein the secondary input further comprises another caller voice input from the caller.

19. The computer system of claim 17, wherein the secondary input is a caller's response to a menu of input options, wherein one of the input options identifies an input whose definition matches that of the specific known digitized voice input from the lexicon of known digitized voice inputs.

20. The computer system of claim 17, wherein the lexicon of known digitized voice inputs is non-exclusive to the caller.

* * * * *